United States Patent
Jeon et al.

(10) Patent No.: US 9,357,529 B2
(45) Date of Patent: May 31, 2016

(54) METHOD AND APPARATUS FOR TRANSMITTING DATA IN WIRELESS COMMUNICATION SYSTEM

(71) Applicant: Samsung Electronics Co., Ltd., Gyeonggi-do (KR)

(72) Inventors: Joseph Jeon, Gyeonggi-do (KR); Ho-Joong Kwon, Gyeonggi-do (KR); Eun-Yong Kim, Gyeonggi-do (KR); June Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 14/372,409

(22) PCT Filed: Jan. 16, 2013

(86) PCT No.: PCT/KR2013/000341
§ 371 (c)(1),
(2) Date: Jul. 15, 2014

(87) PCT Pub. No.: WO2013/109053
PCT Pub. Date: Jul. 25, 2013

(65) Prior Publication Data
US 2014/0357286 A1 Dec. 4, 2014

(30) Foreign Application Priority Data
Jan. 16, 2012 (KR) .................. 10-2012-0004891

(51) Int. Cl.
*H04W 72/00* (2009.01)
*H04W 72/04* (2009.01)
(Continued)

(52) U.S. Cl.
CPC ............. *H04W 72/04* (2013.01); *H04B 7/024* (2013.01); *H04W 76/00* (2013.01); *H04B 7/0456* (2013.01);
(Continued)

(58) Field of Classification Search
CPC ... H04W 72/024; H04W 72/04; H04W 72/12; H04W 76/00; H04W 76/002; H04W 76/02; H04W 76/04; H04W 76/06; H04W 36/12; H04W 72/0406
USPC ............. 455/414.1, 434, 435.1, 435.2, 435.3, 455/444, 445, 515, 520, 450, 451, 452.1
See application file for complete search history.

(56) References Cited

U.S. PATENT DOCUMENTS 7,075,937 B1 * 7/2006 El Kolli .............. H04L 12/2854
370/395.6
2007/0049218 A1 * 3/2007 Gorokhov ............ H04B 7/0417
455/102

(Continued)

FOREIGN PATENT DOCUMENTS

KR   1020100102564   9/2010
KR    101060857      8/2011

(Continued)

OTHER PUBLICATIONS

J. Duplicy, et al., "MU-MIMO in LTE Systems," Submission to Eurasip Journalon Wireless Communications and Networking, MU-MIMO Special Issue, Nov. 2010, (12 pp.).

(Continued)

*Primary Examiner* — Jean Gelin
(74) *Attorney, Agent, or Firm* — The Farrell Law Firm, P.C.

(57) ABSTRACT

The present invention relates to a method and apparatus for transmitting data in a wireless communication system for supporting multi-cells formed of a plurality of sub-cells. The method includes the steps of: connecting at least one virtual transmission port to each of the plurality of sub-cells; determining the transmission mode for a terminal on the basis of channel states between at least two of the plurality of sub-cells and the terminal; and transmitting data for each sub-cell to the terminal through at least one virtual transmission port connected to a corresponding sub-cell on the basis of the determined transmission mode.

14 Claims, 3 Drawing Sheets

(51) Int. Cl.
  *H04B 7/02* (2006.01)
  *H04W 76/00* (2009.01)
  *H04B 7/04* (2006.01)
  *H04B 7/06* (2006.01)
  *H04L 5/00* (2006.01)

(52) U.S. Cl.
  CPC ............ *H04B 7/0617* (2013.01); *H04B 7/0619* (2013.01); *H04L 5/0023* (2013.01); *H04L 5/0044* (2013.01); *H04L 5/0048* (2013.01)

(56) References Cited

U.S. PATENT DOCUMENTS

| | | | |
|---|---|---|---|
| 2010/0118989 A1 | 5/2010 | Sayana et al. | |
| 2010/0234054 A1 | 9/2010 | Ko et al. | |
| 2010/0323684 A1 | 12/2010 | Cai et al. | |
| 2011/0134774 A1* | 6/2011 | Pelletier | H04W 52/365 370/252 |
| 2011/0194551 A1* | 8/2011 | Lee | H04B 7/0626 370/342 |
| 2011/0194594 A1 | 8/2011 | Noh et al. | |
| 2011/0223949 A1 | 9/2011 | Lee et al. | |
| 2012/0114021 A1* | 5/2012 | Chung | H04B 7/155 375/211 |
| 2012/0188881 A1* | 7/2012 | Ma | H04B 7/0697 370/252 |
| 2012/0328035 A1 | 12/2012 | Yoon et al. | |
| 2014/0071952 A1* | 3/2014 | Kim | H04L 5/001 370/335 |

FOREIGN PATENT DOCUMENTS

| | | |
|---|---|---|
| KR | 1020110092478 | 8/2011 |
| KR | 1020110103067 | 9/2011 |

OTHER PUBLICATIONS

PCT/ISA/210, Search Report for PCT/KR2013/000341 (3 pp.).
PCT/ISA/237, Written Opinion for PCT/KR2013/000341 (3 pp.).

* cited by examiner

METHOD AND APPARATUS FOR TRANSMITTING DATA IN WIRELESS COMMUNICATION SYSTEM

PRIORITY

This application is a National Stage application under 35 U.S.C. §371 of International Application No. PCT/KR2013/000341 filed Jan. 16, 2013, which claims priority under 35 U.S.C. §365(b) to Patent Application No. 10-2012-0004891, which was filed in the Korean Intellectual Property Office on Jan. 16, 2012, the content of each of which is incorporated herein by reference.

TECHNICAL FIELD

The present disclosure relates to a wireless communication system, and more particularly, to a method and a device for transmitting data in a wireless communication system supporting a space division multiple access type down link communication.

BACKGROUND

The next generation mobile communication and wireless communication systems require improved data transmission rates and system capacities in the multiple cell environments. In response to such demands, studies on a Multi-Input Multi-Output (MIMO) system transmitting data using a plurality of antennas have been conducted, and a closed loop type MIMO system, using channel state information to improve the data transmission rates in the multiple cell environments, enhances a transmission performance using the channel state information.

Generally, in the MIMO system, a mobile station can recognize information on a receiving channel using received data, whereas a base station cannot recognize the channel state information. Accordingly, the base station has to know the channel state information to improve a performance of the system using the channel state information.

The system using the closed loop MIMO transmits data using information on a transmitting channel of the mobile station serviced by the base station. At this time, the base station cannot recognize the information on the transmitting channel of the mobile station serviced thereby and therefore, the information on the channel, including a Channel Quality Indicator (CQI) and a Pre-coding Matrix Index (PMI), is fed back to the base station from the mobile station.

The mobile station estimates the channel through which data is received, using signals received from the base station. The mobile station calculates the CQI using the estimated channel in order to apply a Modulation Coding Scheme (MCS) suitable for the channel situation when the base station transmits data. Furthermore, channel coefficients most suitable for the channel situation, namely, a pre-coding vector of a code book is selected from the known code book by using the estimated channel and the code book. The channel state information which the mobile station obtains using the estimated channel is transmitted through a feedback channel between the base station and the mobile station. The base station transmits data to the mobile station using the channel information transmitted from the mobile station, the selected MCS, and the pre-coding vector of the code book.

A number of studies on the closed loop MIMO system have been currently conducted, and the closed loop MIMO is employed for the multiple cell environments as well as the single cell environment. However, more studies on the method for reducing effects by interference from other cells in the multiple cell environments are required.

In particular, a mobile station at an edge of a cell receives weak signals from a base station to which it belongs and thus, a base station of an adjacent cell receives interference due to a mobile station belonging to the adjacent cell. Accordingly, a performance of the mobile station located at the edge of the cell is degraded by such interference between the cells.

Furthermore, sub-cells configuring multiple cells in the multiple cell environments are allocated the same cell identifier (e.g., a Physical Cell ID (PCID)) irrespective of the number of transmitting antennas. If the cells are densely arranged on account of an increase in the amount of used data in such a situation, the interference between the cells is increased so that network geometry is decreased, and the performance is deteriorated due to overhead according to handover between the cells.

SUMMARY

Accordingly, an aspect of the present disclosure is to provide a method and a device for transmitting data in a wireless communication system.

Furthermore, another aspect of the present disclosure is to provide a method and a device for efficiently transmitting data from a base station of a wireless communication system including virtual transmission ports to a mobile station.

In accordance with one aspect of the present disclosure, a method of transmitting data in a wireless communication system supporting multiple cells configured with a plurality of sub-cells is provided. The method includes: connecting at least one virtual transmission port respectively to the plurality of sub-cells; determining a transmission mode for a mobile station based on channel states between at least two sub-cells of the plurality of sub-cells and the mobile station; and transmitting, to the mobile station, data according to the sub-cells through the at least one virtual transmission port connected with the corresponding sub-cell based on the determined transmission mode.

In accordance with another aspect of the present disclosure, a base station for transmitting data in a wireless communication system supporting multiple cells configured with a plurality of sub-cells is provided. The base station includes: a transmitting unit that is provided with a plurality of antennas and transmits data according to the sub-cells through a wireless network; and a controller that connects at least one virtual transmission port respectively to the plurality of sub-cells, determines a transmission mode for a mobile station based on channel states between at least two sub-cells of the plurality of sub-cells and the mobile station, and transmits, to the mobile station, data according to the sub-cells through the at least one virtual transmission port connected with the corresponding sub-cell based on the determined transmission mode.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

A detailed description of known functions and configurations incorporated herein will be omitted as it may make the subject matter of the present disclosure rather unclear. Hereinafter, embodiments of the present disclosure will be specifically described with reference to the accompanying drawings.

A main subject matter of the present disclosure is to efficiently transmit data to a mobile station from a base station of a wireless communication system including virtual transmission ports.

Hereinafter, a method and a device for transmitting data to the mobile station from the base station of the wireless communication system according to an embodiment of the present disclosure will be described.

Figure 1:
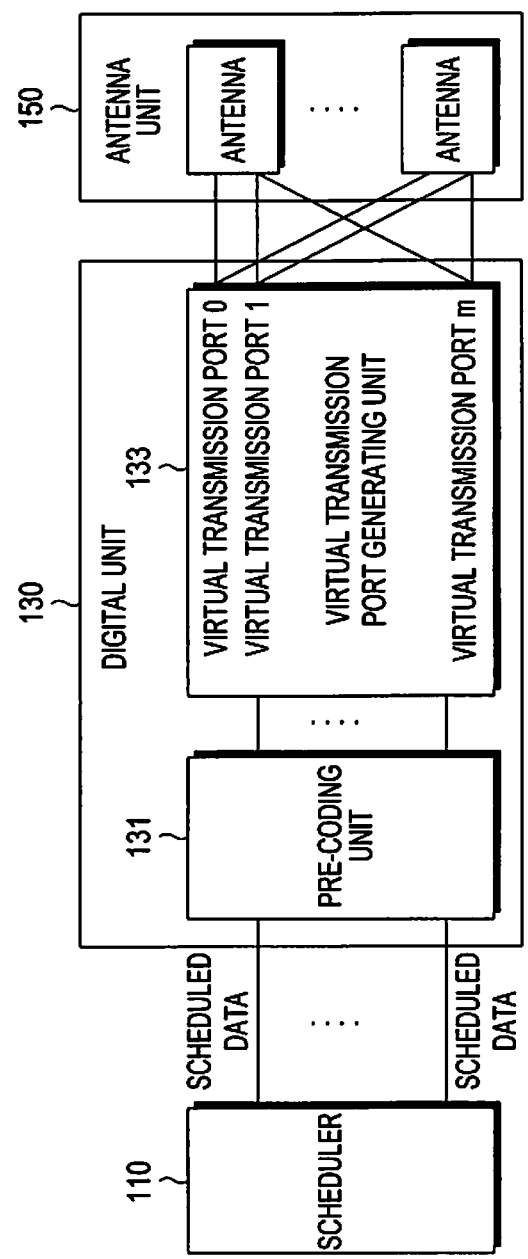
FIG. 1 is a block diagram illustrating a device for transmitting data in a wireless communication system according to an embodiment of the present disclosure.

FIG. 1 is a block diagram illustrating a device for transmitting data in a wireless communication system according to an embodiment of the present disclosure.

The data transmitting device according to the embodiment of the present disclosure includes a scheduler 110, a digital unit 130, and an antenna unit 150. The digital unit 130 includes a pre-coding unit 131 and a virtual transmission port generating block 133.

Here, the embodiment of the present disclosure operates in the wireless communication system in which the virtual transmission ports and sub-cells are connected with each other. Accordingly, an operation of connecting the virtual transmission ports and the sub-cells in the wireless communication system will be described below. At this time, the operation of connecting the virtual transmission ports and the sub-cells is performed by the digital unit 130 as follows.

Further, it will be obvious to those skilled in the art to which the present disclosure pertains that the data transmitting device may be implemented with a transmitting unit and a controller. In this case, the controller may control the operation of connecting the virtual transmission ports and the sub-cells according to the embodiment of the present disclosure.

In a case where a plurality of sub-cells use the same cell ID, all the sub-cells have to know the same control channel and Down Link (DL) reference signal information for channel estimation so as to share scheduling information. Reference signals may be configured to be different or identical for the respective sub-cells.

The virtual transmission ports mix signals such that the sub-cells may share the control channel and the reference signal. For example, assuming a Common Reference Signal (CRS) system in which reference signals are differently transmitted for respective antennas in a 4Tx system based on the Long Term Evolution (LTE) rel.9, signals obtained by mixing CRS 0, 1, 2, and 3 are transmitted to the virtual transmission ports.

To this end, the virtual transmission port generating unit 130 uses a method of multiplying modem port (i.e., CRS port) outputs of the existing system by a specific matrix to generate the signals transmitted to the virtual transmission ports. At this time, the used matrix should satisfy a condition that all output signals exiting from the respective CRS ports are mixed at the same output level.

Signals of CRS ports 0 to n which have been pre-coded by the pre-coding unit 131 are distributed between virtual transmission ports 0 to m included in the virtual transmission port generating unit 133 at the same output level. Signals transmitted from virtual transmission ports 0 to m are transmitted to the antenna unit 150.

The reference signal is a signal for channel estimation and thus, a sum of reference signals which a mobile station receives from several sub-cells should be the same as a value of the existing system which does not use the virtual transmission ports.

Hereinafter, a virtual transmission port is referred to as Vport. The matrix by which the CRS port signals are multiplied for generation of the signals to be transmitted to Vports has to satisfy the following condition. First, the CRS port signals have to be mixed at the same weight. In addition, the CRS port signals have to be mixed such that control channel signals are equally transmitted. For example, when control channels are divided and transmitted for respective antennas through Space-Frequency Block Coded (SFBC) in the 4Tx system, 2Tx cells have to be able to receive the same control channels.

When being multiplied by the matrix (hereinafter, referred to as a common matrix) for generation of the signals to be transmitted to Vports, the CRS port signals are mixed, with data traffic to be transmitted to respective Vports also multiplied by the matrix. Accordingly, in order that the desired data traffic is to be transmitted to respective final Vports, the data traffic is first multiplied by a separate matrix. Such a separate matrix (hereinafter, referred to as a pre-coding matrix) is selected such that the data traffic input to the CRS ports may be distinguished by the mobile station when the separate matrix is multiplied by the common matrix. Namely, the pre-coding matrix is configured such that data may be distinguished, and the mobile station is informed of the pre-coding value used in such a way.

The virtual transmission port generating unit 130 connects the generated virtual transmission ports to the respective sub-cells. At this time, virtual transmission ports of the 4Tx system are output as four Vports. Each sub-cell of 2Tx is connected to two Vports. The Vport connecting method may be divided into two methods as follows.

First, a method of connecting four Vports to two sub-cells of 2TX in a one-to-one correspondence may be used. When there are two sub-cells of sub-cell #1 and sub-cell #2, the sub-cell #1 and the sub-cell #2 may be connected to Vport pairs {0, 1} and {2, 3}, or Vport pairs {0, 2} and {1, 3}, respectively. A constraint on the connection of the sub-cell to Vport is subject to whether there is a pre-coding matrix allowing the mobile station to differentiate data traffic transmitted to respective Vports. Namely, in a case where there is no pre-coding matrix which the mobile station may be informed of when a connection is to be made to Vport pairs {0, 3} and {1, 2}, the connection cannot be made. Such a connection method has an advantage in that the two sub-cells use mutually different pre-coding matrices so that space division multiple access can be made for the two sub-cells.

Second, a method of mutually connecting one of four Vports to sub-cells may be used. For example, when Vport #1 is used in common, the sub-cells may be connected to one of Vport pairs {0, 1}, {0, 2} and {0, 3}. Likewise to the first method, the connection of the sub-cells to Vport may be constrained according to the pre-coding matrix. Such a connection method has an advantage in that the sub-cells share one Vport so that cooperative transmission between the sub-cells is made easier. The cooperative transmission between the sub-cells can be made up to two times depending on the number of 4Tx cells capable of sharing one cell ID.

In the case of the method of mutually connecting one Vport to the sub-cells, Vport matching between the sub-cells may be used as reuse 3. Assuming that there are 6 sub-cells using the same cell ID, in the first method, 3 sub-cells have the same Vport pair as reuse 2. For example, 3 sub-cells are connected to Vport {0, 1} and the remaining 3 sub-cells are connected to Vport pair {2, 3}. In the case of using one Vport in common, 2 sub-cells may be connected to Vport pair {0, 1}, 2 sub-cells may be connected to Vport pair {0, 2}, and 2 sub-cells may be connected to Vport pair {0, 3}.

If the sub-cells using the same cell ID are connected to the same Vport, the same pre-coding matrix is used and thus, the mobile station may not distinguish data. Accordingly, the scheduler 110 has to configure a space division transmission mode through spatial division between the sub-cells using the same Vport, and the transmission mode configuring method for reuse of Vport between the sub-cells is as follows.

The sub-cells connected to Vport may not be able to receive correct signals due to a collision of data traffic between the sub-cells according to the Vport connection configuration. For example, if two sub-cells are connected to Vport {0, 1} of mutually different modems using the same cell ID, respectively, the same pre-coding matrix is used and thus, channel estimation fails, even though different data traffic is transmitted.

Figure 2:
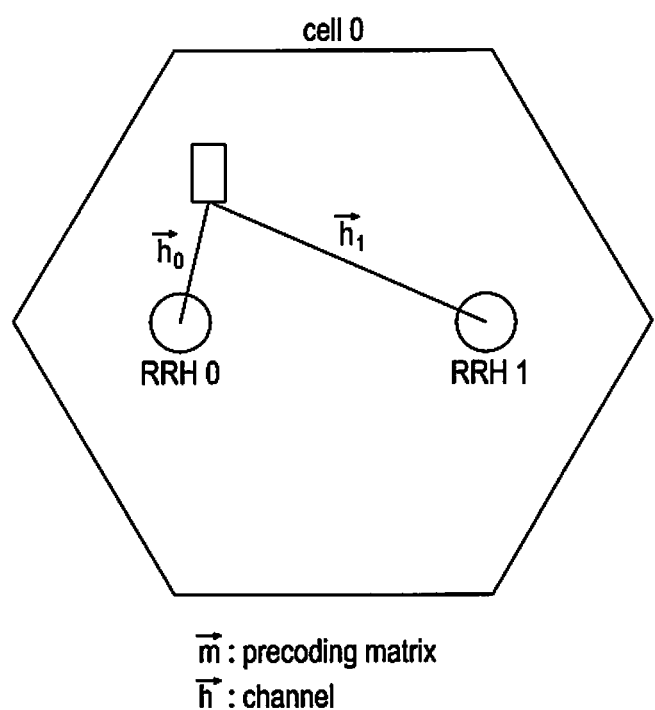
FIG. 2 illustrates an example in which two sub-cells transmit data to one mobile station.

FIG. 2 illustrates an example in which two sub-cells transmit data to one mobile station.

Assuming that $\vec{h}_0$ and $\vec{h}_1$ denote channels transmitted from two sub-cells to a mobile station, respectively, and $\vec{m}$ denotes a pre-coding matrix, only the signal from the desired sub-cell may be distinguished by Equation 1 below when mutually different Vport pairs are used.

$$\vec{y} = \vec{h}_0 \vec{m}_0 x_0 + \vec{h}_1 \vec{m}_1 x_1 + \vec{n}$$

$$\hat{x}_0 = \left((\vec{h}_0 + \vec{h}_1)\vec{m}_0\right)^H (\vec{h}_0 \vec{m}_0 x_0 + \vec{h}_1 \vec{m}_1 x_1 + \vec{n})$$

$$= RxP_0 x_0 + \left((\vec{h}_0 + \vec{h}_1)\vec{m}_0\right)^H \vec{n}.$$

Equation 1

However, when the same Vport pair is used, an undistinguishable signal element remains as represented by Equation 2 below to cause data pollution.

$$\vec{y} = \vec{h}_0 \vec{m}_0 x_0 + \vec{h}_1 \vec{m}_0 x_1 + \vec{n}$$

$$\hat{x}_0 = \left((\vec{h}_0 + \vec{h}_1)\vec{m}_0\right)^H (\vec{h}_0 \vec{m}_0 x_0 + \vec{h}_1 \vec{m}_0 x_1 + \vec{n})$$

$$= RxP_0 x_0 + RxP_1 x_1 + \left((\vec{h}_0 + \vec{h}_1)\vec{m}_0\right)^H \vec{n}$$

Equation 2

Accordingly, in this case, a difference between signal intensities from the two sub-cells for the mobile station has to be maintained such that the undistinguishable signal is received with a signal intensity which is not decoded (i.e., unavailable).

A sub-cell transmission mode is classified into a Multi-Input Multi-Output/Single-Input Multiple Output (MIMO/SIMO) transmission mode, a cooperative transmission mode, and a general transmission mode according to a Vport configuration such as a case of differently using Vports between sub-cells and a case of sharing one Vport.

The mode classification is configured according to an intensity of signals received from the sub-cells by the mobile station and therefore, the mode is classified for each mobile station. Thus, the mode classifying method is configured by the intensity of the signals between the mobile station and the sub-cells and the Vport configuration of the sub-cells.

Figure 3:
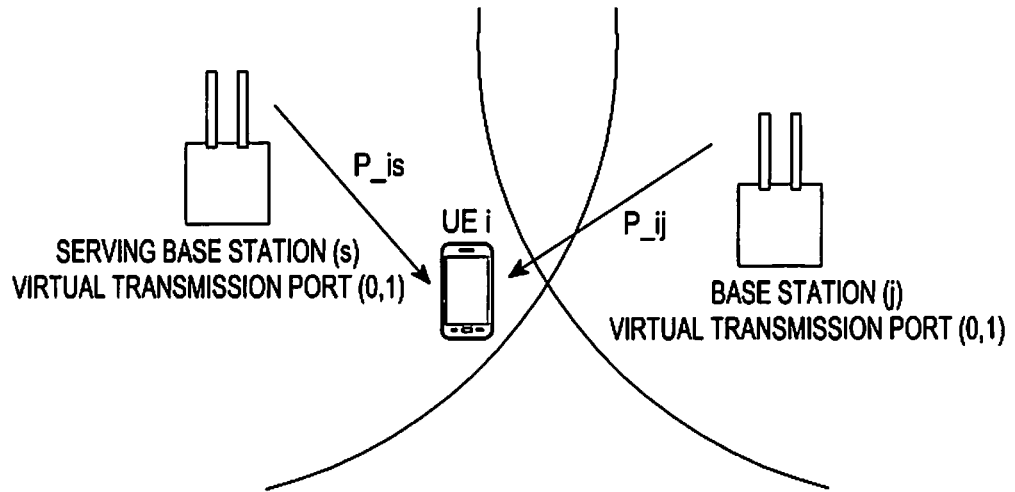
FIG. 3 illustrates an example of a case where reception signal intensities and virtual transmission ports of sub-cells are configured in a situation in which a mobile station and the sub-cells are arranged.

A) In the case of differently using Vports between the sub-cells, namely, in the case of dividing 4Tx into Vport {0, 1} and Vport {2, 3}, the sub-cell transmission mode is classified into the cooperative transmission mode and the general transmission mode. The cooperative transmission mode is configured in a case in which a difference between signal intensities from sub-cells having the same Vport pair is not larger than a predetermined threshold value so that data pollution occurs due to the undesired signal in Equation 2. As an example, a case will be described in which reception signal intensities and Vports of sub-cells are configured in a situation where a mobile station and the sub-cells are arranged as illustrated in FIG. 3. That is, when a difference between an intensity $P_A$ of a signal which the mobile station receives from a serving sub-cell A and an intensity $P_B$ of a signal which the mobile station receives from a neighboring sub-cell B having the same Vport pair satisfies Equation 3 below, the corresponding mobile station is configured in the cooperative transmission mode.

$$P_A - P_B \leq P_{th}$$

Equation 3

Here, $P_{th}$ denotes a threshold value of a signal intensity difference causing the data pollution. When one or more neighboring sub-cells having the same Vport pair as that of the serving sub-cell among sub-cells using the same cell ID satisfy Equation 3, the mobile station serves as a cooperative transmission mode mobile station. Furthermore, all the sub-cells satisfying Equation 3 other than the serving sub-cell serve as cooperative transmission sub-cells of the corresponding mobile station. The cooperative transmission mode mobile station has to be scheduled such that all the cooperative transmission sub-cells transmit the same signal to the corresponding mobile station in the same frequency region during the scheduling. In this case, both SIMO and MIMO transmission can be made for 2Tx stream. That is, either one data stream or two data streams can be transmitted.

For a mobile station that does not satisfy the cooperative transmission mode condition, both SIMO and MIMO transmission can be made between the sub-cells having the same Vport pair according to a channel state without any constraint. In a case where the cooperative transmission mode mobile station and the non-cooperative transmission mode mobile station simultaneously require the same frequency resource, the non-cooperative transmission mode mobile station is allocated to the sub-cells or the cooperative transmission mode mobile station is allocated to the cooperative transmission sub-cells according to a predetermined scheduling matrix.

B) In the case of sharing Vport, namely, in the case of dividing 4Tx into Vport pairs {0, 1}, {0, 2}, and {0, 3}, the sub-cell transmission mode is classified into the MIMO/SIMO transmission mode, the cooperative transmission mode, and the general transmission mode. In this case, all the sub-cells share Vport 0 and therefore, if one or more of the sub-cells using the same cell ID satisfy Equation 3 irrespective of the Vport pair, data pollution may occur for data traffic transmitted to Vport 0. However, even through the data pollution occurs for Vport 0, space division multiple transmission can be made between the sub-cells through the SIMO transmission in a case in which the other Vport is different.

When a difference between an intensity PA of a signal which the mobile station receives from a serving sub-cell A and an intensity PB of a signal which the mobile station receives from a neighboring sub-cell B having the same Vport pair satisfies Equation 4 below, the mobile station is configured in the MIMO transmission mode. At this time, all neighboring sub-cells having the same cell ID and the same Vport pair have to satisfy Equation 4.

$$P_A - \text{Max}(P_B) > P\_mimo\_th \quad \text{Equation 4}$$

P_mimo_th is a value larger than a threshold value of a signal intensity difference by which the data pollution occurs. The mobile station in the MIMO transmission mode can perform both SIMO and MIMO transmission for 2Tx stream if necessary.

The mobile station which does not satisfy Equation 4 is configured in the SIMO transmission mode, and transmission for the corresponding mobile station is performed using unshared Vport.

In the configuration of sharing Vport, the cooperative transmission mode may be performed in the following two cases.

First, the mobile station having the same Vport pair satisfying Equation 3 is configured in the cooperative transmission mode. In this case, the corresponding mobile station has to unconditionally perform transmission in the cooperative transmission mode, and has to be scheduled such that all the cooperative transmission sub-cells transmit the same signal to the corresponding mobile station in the same frequency region during the scheduling.

In the case of not satisfying Equation 3, cooperative transmission can be made using a shared Vport. In this case, the mobile station may receive cooperative transmission from the sub-cells sharing the same cell ID if necessary.

The scheduler 110 schedules data for the mobile station based on the configured transmission mode of the mobile station. The scheduler 110 may use a distributed system for exchanging information for each of the sub-cells and a centralized system for performing scheduling by one common scheduler, and perform coordinated scheduling using information between the sub-cells.

The scheduling performed by the scheduler 110 according to the transmission mode of the mobile station and the virtual transmission port configuration has the following limitations.

A) In a case in which the mobile station in the cooperative transmission mode is first selected, the scheduling is performed such that all the cooperative transmission sub-cells transmit the same signal for resources required for the corresponding mobile station.

B) In a case in which the mobile station configured in the SIMO transmission mode is first selected, transmission is limited to be made through 1 stream even in the state where all of 2 streams are available according to the channel state and a request of the mobile station. At this time, the Vport used for transmission serves as an unshared Vport.

C) In a case in which the mobile station configured in the MIMO transmission mode is first selected, transmission can be made through 2 streams or 1 stream according to the channel state and a request of the mobile station.

D) In a case in which the mobile station that is not in the cooperative transmission mode is first selected, frequency resources may be allocated in such a manner to allow data traffics of different mobile stations according to sub-cells to be transmitted through the same frequency between sub-cells having the same cell ID. However, this is allowed only in sub-cells which are not cooperative transmission sub-cells for a first selected cooperative transmission mode mobile station.

Figure 4:
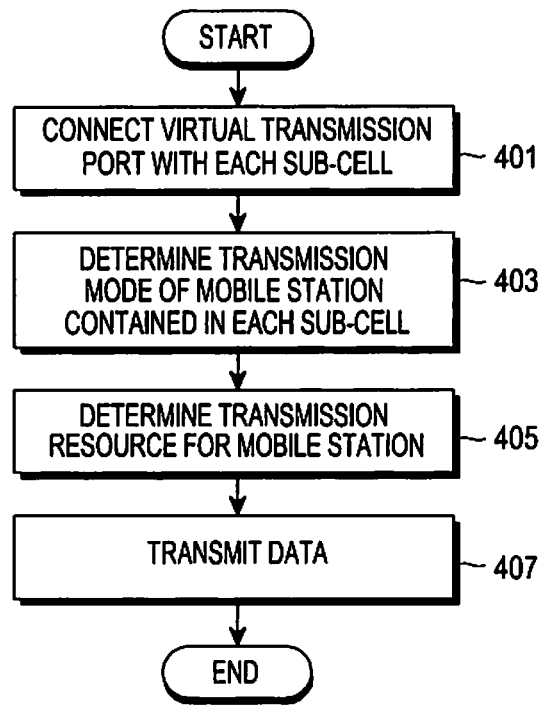
FIG. 4 is a flowchart illustrating a method of transmitting data in a wireless communication system according to an embodiment of the present disclosure.

FIG. 4 is a flowchart illustrating a method of transmitting data in a wireless communication system according to an embodiment of the present disclosure. Since the operations of the present disclosure performed in the respective devices have been described above in detail, detailed description thereof will be omitted in the following description.

Referring to FIG. 4, a virtual transmission port generating unit 130 connects virtual transmission ports with respective sub-cells in step 401. At this time, the virtual transmission port generating unit 130 connects different virtual transmission ports to the respective sub-cells, or mutually connects one of a plurality of virtual transmission ports to the respective sub-cells. Namely, the respective sub-cells may be connected to mutually different virtual transmission ports or the same virtual transmission port. The wireless communication system transmits data as in steps 403 to 407.

In step 403, a scheduler 110 configures a transmission mode of a mobile station contained in the sub-cells in view of an intensity of signals between the mobile station and the sub-cells and the connection configuration of the virtual transmission ports and the sub-cells. Here, the transmission mode of the mobile station includes at least one of a MIMO/SIMO transmission mode, a cooperative transmission mode, and a general mode.

In step 405, the scheduler 110 schedules data for the mobile station based on the configured transmission mode of the mobile station.

In step 407, a digital unit 130 performs pre-coding for the scheduled data and transmits the pre-coded data to an antenna unit 150 through the virtual transmission ports, and the antenna unit 150 transmits the pre-coded data to a receiver (not illustrated).

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

What is claimed is:

1. A method of transmitting data in a wireless communication system supporting multiple cells configured with a plurality of sub-cells, the method comprising:
   connecting at least one virtual transmission port respectively to the plurality of sub-cells;
   identifying a transmission mode for a mobile station based on a channel state associated with at least two sub-cells and a channel state associated with the mobile station; and
   transmitting, to the mobile station, data through the at least one virtual transmission port based on the identified transmission mode,
   wherein the transmission mode is identified among transmission modes comprising a first transmission mode in which the at least two sub-cells perform transmission to the mobile station and a second transmission mode in which each of the sub-cells performs transmission individually.

2. The method of claim 1, wherein data transmitted through the at least one virtual transmission port comprises a signal obtained by multiplying data input for transmission by a pre-coding matrix for pre-coding and a specific matrix for connecting the virtual transmission port.

3. The method of claim 2, wherein the specific matrix satisfies a condition that reference signals transmitted together with the data according to the sub-cells are mixed at the same output level in the respective virtual transmission ports.

4. The method of claim 2, wherein the specific matrix satisfies a condition that a sum of reference signals that the mobile station receives from the respective sub-cells is the same as that of reference signals that an existing system which does not use the virtual transmission port receives from the sub-cells.

5. The method of claim 1, wherein each of the sub-cells is connected to a virtual transmission port different from that to which another sub-cell is connected.

6. The method of claim 1, wherein each of the sub-cells is connected to the same virtual transmission port as that to which another sub-cell is connected.

7. The method of claim 1, wherein the first transmission mode of the mobile station comprises a cooperative mode in which, when there is a neighboring sub-cell for which a difference between an intensity of a signal which the mobile station receives from a serving sub-cell among the at least two sub-cells and an intensity of a signal which the mobile station receives from the neighboring sub-cell is not larger than a threshold value, the serving sub-cell and the neighboring sub-cell transmit the data according to the sub-cells to the mobile station using the same frequency resource.

8. A base station for transmitting data in a wireless communication system supporting multiple cells configured with a plurality of sub-cells, the base station comprising:
   a transmitting unit that is provided with a plurality of antennas and transmits data according to the sub-cells through a wireless network; and
   a controller that connects at least one virtual transmission port respectively to the plurality of sub-cells, identifies a transmission mode for a mobile station based on a channel state associated with at least two sub-cells and a channel state associated with the mobile station, and transmits, to the mobile station, data through the at least one virtual transmission port based on the identified transmission mode,
   wherein the transmission mode is identified among transmission modes comprising a first transmission mode in which the at least two sub-cells perform transmission to the mobile station and a second transmission mode in which each of the sub-cells performs transmission individually.

9. The base station of claim 8, wherein data transmitted through the at least one virtual transmission port comprises a signal obtained by multiplying data input for transmission by a pre-coding matrix for pre-coding and a specific matrix for connecting the virtual transmission port.

10. The base station of claim 9, wherein the specific matrix satisfies a condition that reference signals transmitted together with the data according to the sub-cells are mixed at the same output level in the respective virtual transmission ports.

11. The base station of claim 9, wherein the specific matrix satisfies a condition that a sum of reference signals that the mobile station receives from the respective sub-cells is the same as that of reference signals that an existing system which does not use the virtual transmission port receives from the sub-cells.

12. The base station of claim 8, wherein each of the sub-cells is connected to a virtual transmission port different from that to which another sub-cell is connected.

13. The base station of claim 8, wherein each of the sub-cells is connected to the same virtual transmission port as that to which another sub-cell is connected.

14. The base station of claim 8, wherein the first transmission mode of the mobile station comprises a cooperative mode in which, when there is a neighboring sub-cell for which a difference between an intensify of a signal which the mobile station receives from a serving sub-cell among the at least two sub-cells and an intensity of a signal which the mobile station receives from the neighboring sub-cell is not larger than a threshold value, the serving sub-cell and the neighboring sub-cell transmit the data according to the sub-cells to the mobile station using the same frequency resource.

* * * * *